(12) United States Patent
Halder

(10) Patent No.: US 8,700,324 B2
(45) Date of Patent: Apr. 15, 2014

(54) MACHINE NAVIGATION SYSTEM HAVING INTEGRITY CHECKING

(75) Inventor: Bibhrajit Halder, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 799 days.

(21) Appl. No.: 12/868,429

(22) Filed: Aug. 25, 2010

(65) Prior Publication Data

US 2012/0053831 A1 Mar. 1, 2012

(51) Int. Cl.
*G01C 21/12* (2006.01)

(52) U.S. Cl.
USPC ............ 701/498; 701/408; 701/494; 701/417

(58) Field of Classification Search
None
See application file for complete search history.

(56) References Cited

U.S. PATENT DOCUMENTS

| | | | |
|---|---|---|---|
| 5,155,688 A * | 10/1992 | Tanaka et al. ................. | 701/472 |
| 5,422,639 A * | 6/1995 | Kobayashi et al. ............ | 340/988 |
| 5,483,455 A | 1/1996 | Lay et al. | |
| 5,617,317 A * | 4/1997 | Ignagni .......................... | 701/470 |
| 5,646,845 A * | 7/1997 | Gudat et al. .................... | 701/41 |
| 5,906,655 A * | 5/1999 | Fan ................................ | 701/472 |
| 6,292,751 B1 | 9/2001 | Frank | |
| 6,785,609 B2 * | 8/2004 | Suda ............................. | 701/472 |
| 6,789,014 B1 | 9/2004 | Rekow et al. | |
| 6,826,478 B2 | 11/2004 | Riewe et al. | |
| 6,859,729 B2 | 2/2005 | Breakfield et al. | |
| 7,003,386 B1 | 2/2006 | Ericsson et al. | |
| 7,219,013 B1 | 5/2007 | Young et al. | |
| 7,328,104 B2 | 2/2008 | Overstreet et al. | |
| 7,346,452 B2 | 3/2008 | Ford et al. | |
| 7,409,290 B2 | 8/2008 | Lin | |
| 7,505,865 B2 | 3/2009 | Ohkubo et al. | |
| 8,510,044 B2 * | 8/2013 | Watanabe et al. .............. | 701/472 |
| 2003/0163255 A1 | 8/2003 | Ishigami et al. | |
| 2008/0059068 A1 | 3/2008 | Strelow et al. | |
| 2008/0091351 A1 | 4/2008 | Hoshizaki | |
| 2008/0154495 A1 | 6/2008 | Breed | |
| 2009/0125234 A1 | 5/2009 | Geelen et al. | |

FOREIGN PATENT DOCUMENTS

JP 2002188920 7/2002

* cited by examiner

*Primary Examiner* — Ramsey Refai
(74) *Attorney, Agent, or Firm* — Finnegan, Henderson, Farabow, Garrett & Dunner LLP

(57) ABSTRACT

A navigation system for a machine is disclosed. The navigation system may have a navigation unit configured to measure a position of a machine at a first time and at a second time, and at least a first sensor configured to generate at least a first signal indicative of a speed and a heading of the machine during a time period from the first time to the second time. The navigation system may also have a controller configured to estimate a position of the machine at the second time based on the measured position of the machine at the first time and the at least a first signal, and to make a comparison of the measured position of the machine at the second time with the estimated position of the machine at the second time. The controller may also be configured to determine an integrity of the navigation unit based on the comparison.

15 Claims, 2 Drawing Sheets

MACHINE NAVIGATION SYSTEM HAVING INTEGRITY CHECKING

TECHNICAL FIELD

The present disclosure relates generally to a navigation system and, more particularly, to a machine navigation system having integrity checking.

BACKGROUND

Machines such as on- or off-highway haul trucks, motor graders, snow plows, and other types of heavy equipment are used to perform a variety of tasks. Some of these tasks involve carrying or pushing large, awkward, loose, and/or heavy loads up steep inclines or along rough or poorly marked haul roads. And, because of the size and momentum of the machines and/or because of poor visibility, these tasks can be difficult for a human operator alone to complete effectively.

To help guide large machines safely and efficiently along haul roads, some machines are equipped with sensors, for example, GPS sensors, RADAR sensors, SONAR sensors, LIDAR sensors, IR and non-IR cameras, and other similar sensors. These sensors are often connected to a visual display and/or to a guidance system of the machine such that control over machine maneuvering may be enhanced or even automated. In order for these display and guidance systems to operate properly, the information provided by the sensors must be accurate. And, even though most machine sensor systems are calibrated when first commissioned, vibrations, collisions, and damage to the machine during operation can reduce the quality of information provided by the sensors. As such, periodic checks on the integrity of the sensors can be beneficial.

An exemplary machine system that provides periodic integrity checks is disclosed in U.S. Pat. No. 5,906,655 issued to Fan on May 25, 1999 ("the '655 patent"). Specifically, the '655 patent discloses an integrated machine positioning system having a GPS receiver and an Inertial Navigation Unit (INU). The INU includes an odometer, a Doppler radar, a gyroscope, and a sensor for measuring a steering angle of a mobile machine. The machine positioning system receives a GPS position estimate from the GPS receiver and an INU position estimate from the INU, and compares the two position estimates. If the two position estimates are the same, the system is considered valid. Otherwise, the velocity of the mobile machine, as determined by the odometer and by the Doppler radar, are compared. If the difference in velocities is greater than a first predetermined threshold, then the INU is determined to be invalid. If the difference in velocities is less than the first predetermined threshold, a heading rate from the gyroscope is compared with a calculated heading rate based on measured steering angle and velocity. If the difference in heading rates is greater than a second predetermined threshold, then the INU is considered to be invalid. Otherwise, the GPS is considered to be invalid.

Although the machine positioning system of the '655 patent may be helpful in some situations, the system may be less than optimal. Specifically, the system requires two separate and redundant navigation units, which can increase the cost and complexity of the system. In addition, the system may be prone to false alarms due to transient changes in sensor values, sensor noise, and external conditions such as machine slipping and sliding. Further, the system of the '655 patent may be unable to detect error drift over time.

The disclosed navigation system is directed to overcoming one or more of the problems set forth above and/or other problems of the prior art.

SUMMARY

In one aspect, the present disclosure is directed to a navigation system. The navigation system may include a navigation unit configured to measure a position of a machine at a first time and at a second time, at least a first sensor configured to generate at least a first signal indicative of a speed and a heading of the machine during a time period from the first time to the second time, and a controller in communication with the navigation unit and the at least a first sensor. The controller may be configured to estimate a position of the machine at the second time based on the measured position of the machine at the first time and the at least a first signal, and to make a comparison of the measured position of the machine at the second time with the estimated position of the machine at the second time. The controller may also be configured to determine an integrity of the navigation unit based on the comparison.

In yet another aspect, the present disclosure is directed to a computer readable medium for use by a navigation system. The computer readable medium may have executable instructions for performing a method of accuracy checking a measured position. The method may include measuring a position of a machine at a first time and at a second time, measuring a speed and a heading of the machine during a time period from the first time to the second time, and estimating a position of the machine at the second time based on the measured position of the machine at the first time and the measured speed and heading. The method may also include making a comparison of the measured position of the mobile machine at the second time with the estimated position of the mobile machine at the second time, and determining an accuracy of the measured position at the second time based on the comparison.

DETAILED DESCRIPTION

Figure 1:
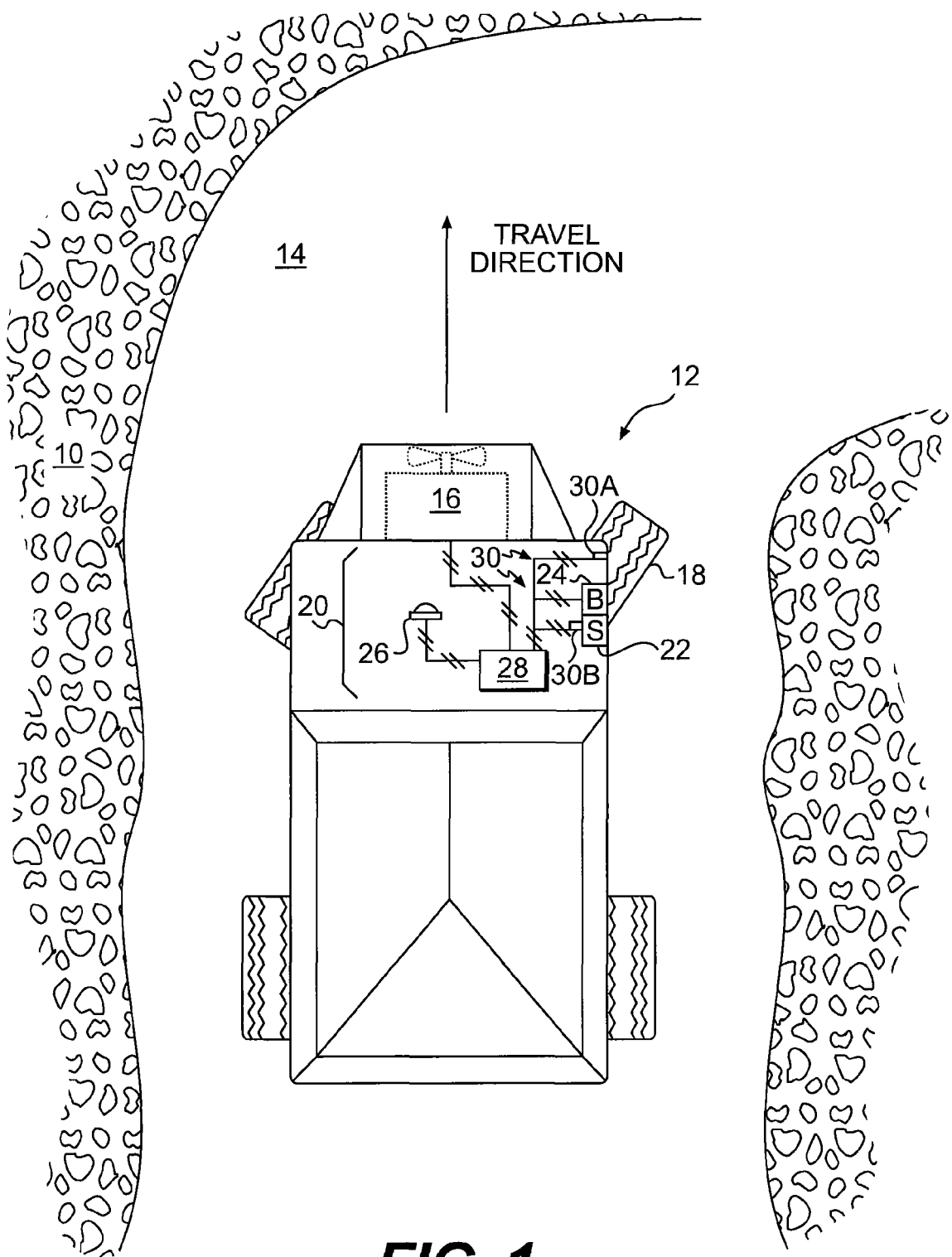
FIG. 1 is a pictorial illustration of an exemplary disclosed machine navigation system.

FIG. 1 illustrates a worksite 10 and an exemplary machine 12 performing a task at worksite 10. Worksite 10 may include, for example, a mine site, a landfill, a quarry, a construction site, or any other type of worksite having a roadway or ground surface 14 traversable by machine 12. The task being performed by machine 12 may be associated with altering the geography at worksite 10 and may include, for example, a hauling operation, a grading operation, a leveling operation, a plowing operation, a bulk material removal operation, or any other type of operation. As such, machine 12 may embody a mobile machine, for example a haul truck, a motor grader, a loader, or a snow plow. Machine 12 may include, among other things, a power source 16, one or more traction devices 18, and a navigation system 20. Power source 16 may generate and provide power to traction devices 18 to propel machine 12, while navigation system 20 may regulate operation of power source 16 and/or traction devices 18 to maneuver machine 12 in response to various inputs.

Power source 16 may embody an internal combustion engine such as, for example, a diesel engine, a gasoline engine, a gaseous fuel-powered engine, or any other type of engine apparent to one skilled in the art. Power source 16 may alternatively or additionally include a non-combustion source of power such as a fuel cell, a power storage device, an electric motor, or other similar mechanism. Power source 16 may be connected to drive traction devices 18 via a direct mechanical coupling, a hydraulic circuit, an electrical circuit, or in any other suitable manner.

Traction device 18 may be a wheel, a belt, a track, or another traction device known in the art. One or more of traction devices 18 may be driven by power source 16 to rotate and propel machine 12 in accordance with an output rotation of power source 16. A steering device 22, for example a hydraulic cylinder, a hydraulic motor, an electric motor, and/or a rack-and-pinion configuration may be associated with one or more traction device 18 to affect steering thereof. In addition, a braking device 24, for example a compression disk brake, an internal fluid brake, an engine retarder, an exhaust brake, and/or a transmission brake may be associated with one or more traction device 18 and/or power source 16 to affect braking of machine 12.

Navigation system 20 may include multiple components that interact to help regulate maneuvering of machine 12. Specifically, navigation system 20 may include a navigation unit 26, and a controller 28 in communication with power source 16, traction device 18, steering device 22, braking device 24, and/or navigation unit 26. Controller 28 may be configured to partially or fully control maneuvering (i.e., propulsion, steering, and/or braking) of machine 12 based on input received from navigation unit 26 and/or from an operator of machine 12.

Navigation unit 26 may be configured to determine a position of machine 12 at worksite 10 and to generate a signal indicative thereof. For example, navigation unit 26 may embody a Global Positioning System (GPS) unit, an Inertial Reference/Measurement Unit (IR/MU), a local tracking system, or any other known locating device configured to receive or determine positional information associated with machine 12. In one embodiment, the positional information from navigation unit 26 may be three-dimensional, although units providing only two-dimensional information may also be used. Navigation unit 26 may be in communication with controller 28 to convey a signal indicative of the received or determined positional information.

Controller 28 may include components for monitoring, recording, storing, indexing, processing, and/or communicating the geographical location of machine 12 as measured and provided by navigation unit 26, and for partially or fully controlling maneuvering (i.e., propulsion, steering, and/or braking) of machine 12 in response to this information. These components may include, for example, a memory, one or more data storage devices, a central processing unit, or any other components that may be used to run the disclosed application. Furthermore, although aspects of the present disclosure may be described generally as being stored within memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

In order for the information provided by navigation unit 26 to be most accurate and useful to controller 28 during autonomous or semi-autonomous control of machine 12, the accuracy of navigation unit 26 should be periodically checked, and a deviation from a desired accuracy accounted for. Ideally, the accuracy of navigation unit 26 always substantially matches a desired accuracy. However, errors incurred during assembly and undesired movement or damage of navigation unit 26 during operation of machine 12 may cause the actual accuracy of navigation unit 26 to drift away from the desired accuracy. Controller 28 may be configured to receive signals from navigation unit 26 and execute sequences of computer program instructions stored on the computer readable media to perform a method of navigation integrity checking and control that will be explained below.

The method performed by controller 28 may generally include the steps of measuring a position of machine 12 via navigation unit 26 at a time T1, estimating a position of machine 12 at a later time T2 based on the measured position and other input, measuring a position of machine 12 via navigation unit 26 at time T2, making a comparison of the measured position at the time T2 to the estimated position at time T2, and selectively taking corrective and/or evasive action based on this comparison. Response to the comparison may vary and be based on a difference between the measured position and the estimated position (e.g., based on an error value calculated as a function of this difference). For example, if the measured position is about equal to the estimated position, controller 28 may not affect machine maneuvering at all. However, if the measured position is substantially different from the estimated position (i.e., different by at least a threshold amount), controller 28 may warn an operator of machine 12 that navigation system 20 may be malfunctioning, recommend action by the operator, autonomously control steering device 22 to maneuver machine 12 toward a known safe location, autonomously control braking device 24 to slow or even stop travel of machine 12, and/or implement other evasive maneuvering. It is contemplated that the level of difference between the measured and estimated positions that triggers a specific response by controller 28, as well as which of the responses is triggered, may be adjustable, if desired. It is also contemplated that, in some embodiments, the difference between the measured and estimated machine positions must be larger than the threshold amount for a set period of time before evasive maneuvering is implemented such that evasive maneuvering is not falsely triggered due to a short lapse in satellite coverage associated with navigation unit 26. During these lapses of satellite coverage or during other short periods of navigation malfunction, controller 28 may be configured to replace the measured position at time T2 with the estimated position for use in autonomous control of machine 12, if desired.

Controller 28 may be configured to estimate the position of machine 12 at time T2 based on the measured position at time T1 provided by navigation unit 26 and based on machine parameters continuously sensed during the period between time T1 and time T2. Specifically, navigation system 20 may include at least one sensor 30 used by controller 28 during integrity checking of navigation unit 26 to estimate the position of machine 12. In a particular embodiment, navigation system 20 includes two different sensors, for example a travel speed sensor 30A and at least one heading sensor 30B. Controller 28 may receive from navigation unit 26 information regarding the first position of machine 12 at time T1; receive from sensors 30A and 30B information regarding the travel speed and the heading of machine 12 during the period from the time T1 to the later time T2; calculate a total distance traveled by machine 12 in a particular direction since the time T1 based on the sensed travel speed, the time period, and the sensed heading; and estimate the position of machine 12 at time T2 based on the position at time T1, the distance traveled since the time T1, and the travel direction from time T1. Controller 28 may have algorithms stored in memory that are associated with each calculation used during the estimation of machine position at time T2.

Controller 28 may also be configured to determine accuracy drift of navigation unit 26. Specifically, controller 28 may be configured to record the estimated and measured positions of machine 12 at successive time intervals, and perform trend analysis on the recorded information to determine the accuracy drift. For example, controller 28 may store an estimated position for machine 10 at a future time T10 based on the measured position of machine 10 at time T1 and the speed and heading of machine 10 measured during the period from time T1 to time T10, store an estimated position for the position for machine 10 at a future time T10 based on the measured position of machine 10 at time T2 and the speed and heading of machine 10 measured during the period from time T2 to time T10, store an estimated position for the position for machine 10 at a future time T10 based on the measured position of machine 10 at time T3 and the speed and heading of machine 10 measured during the period from time T3 to time T10, etc. Controller 28 may then compare the measured position at time T10 with each of the estimated positions from times T1-T9, and determine multiple error terms for navigation system 20, for example E1-E9. Controller 28 may then weight these error values according to one or more predefined criteria, and calculate a residual signal R. If the residual signal is greater than a threshold error value, navigation system 20 may be determined to be drifting. Controller 28 may then be configured to implement different responses (i.e., take different corrective actions) based on the drift, even if differences between individual measured and estimated position values do not yet exceed the threshold difference amount described above. It is contemplated that any number of estimated positions may be compared to a single measured position, for example, 10, 15, 50, as desired.

Sensor 30A may embody a magnetic pickup-type sensor configured to provide an indication as to the rotational speed of traction devices 18. In one example, sensor 30A may include a hall-effect element (not shown) disposed proximate a magnet (not shown) embedded within a hub of traction device 18, an axle of traction device 18, and/or a rotating component of a reducing gear arrangement or transmission (not shown) that drives traction device 18. In this position, the hall-effect element may sense a rotational speed of traction devices 18 and produce a corresponding travel speed signal. Alternatively, sensor 30A may embody another type of sensor, for example an optical sensor, a radar sensor, a Doppler sensor, or any other type of travel speed sensor known in the art, if desired. The signal from sensor 30A may be directed to controller 28 for processing and control purposes.

Heading sensor 30B may be configured to sense a heading of machine 12 and generate at least one corresponding signal. In a particular embodiment, the heading of machine 12 is sensed in only two dimensions (i.e., in an x-y plane generally parallel with the ground surface 14). In most situations, two-dimensional heading information may be all that is required for autonomous control of machine 12 and/or integrity checking of navigation unit 26, as machine 12 is generally capable of only planar movements. As such, heading sensor 30B may be a single steering angle sensor associated with traction device 18 and configured to generate a first signal indicative of an angle of traction device 18 away from a fore/aft direction of machine 12. The steering angle sensor may be associated with a steering cylinder that causes traction device 18 to pivot away from the fore/aft direction, and in this configuration, the steering angle sensor may be configured to detect an extension length of the cylinder and generate a corresponding signal that is indicative of the pivot angle of traction device 18. In another example, the steering angle sensor may be associated with a pivot axle of traction device 18 to directly measure the rotation angle of traction device 18. It should be noted that any type of steering angle sensor may be utilized in conjunction with known kinematics of machine 12 to generate a signal indicative of the heading of machine 12.

In some embodiments, heading information in three dimensions may be helpful for autonomous machine control and/or navigation unit integrity checking. In these embodiments, it is contemplated that heading sensor 30B may additionally include a pitch, roll, and/or yaw sensor (not shown), if desired. For example, a second signal from a pitch sensor may help to determine if the heading of machine 12 during the period from time T1 to time T2 includes an elevation parameter.

Figure 2:
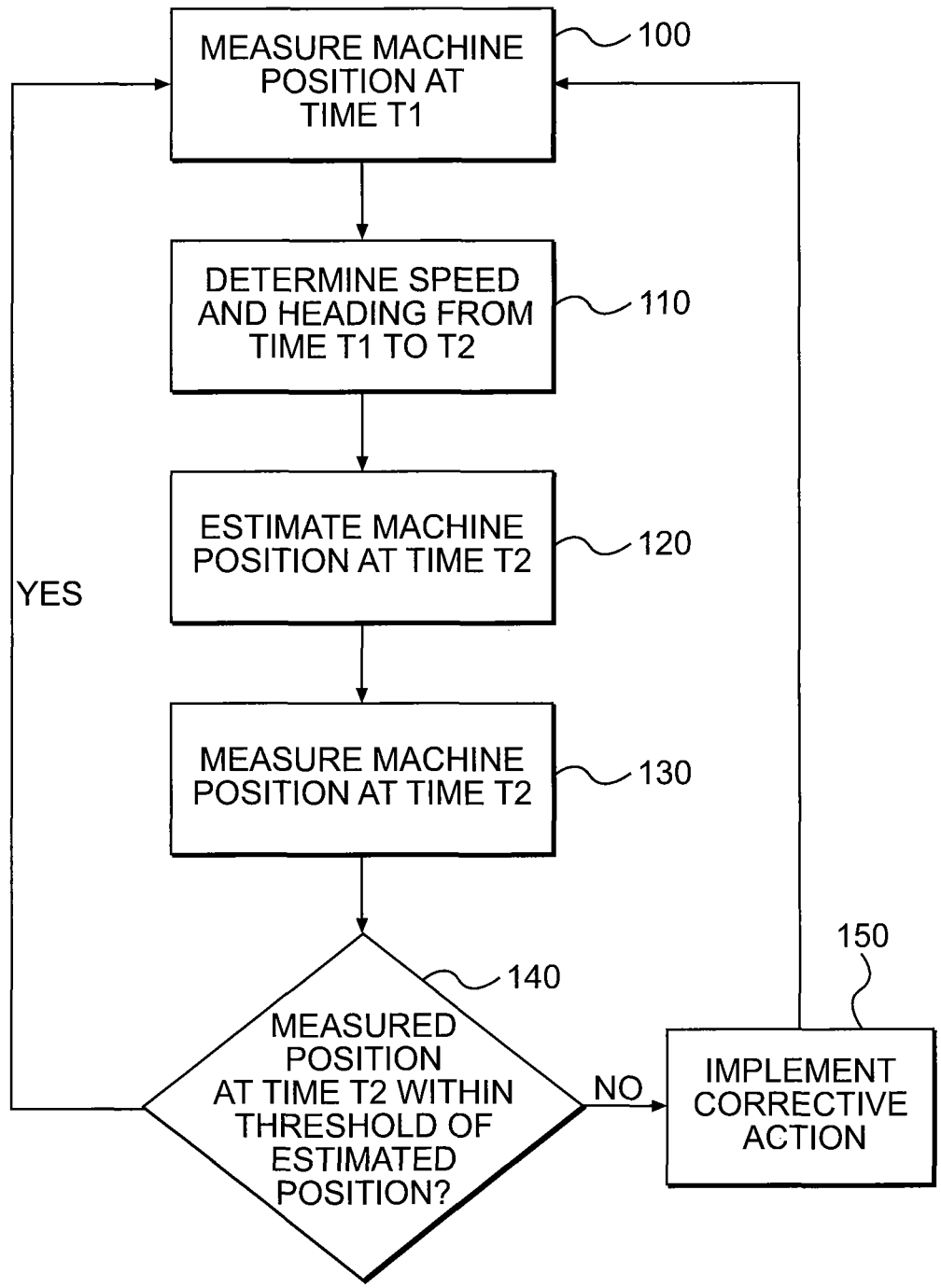
FIG. 2 is a flowchart depicting an exemplary disclosed method that may be performed by the machine navigation system of FIG. 1.

FIG. 2 illustrates the exemplary disclosed method, which can be stored as instructions on the computer readable medium for execution by controller 28 during navigation integrity checking. FIG. 2 will be discussed in more detail in the following section to further illustrate the disclosed concepts.

INDUSTRIAL APPLICABILITY

The disclosed navigation system may be applicable to any mobile machine that utilizes position detection. The disclosed navigation system may help determine an accuracy of a detected position and provide for evasive machine maneuvering during system malfunctioning. The disclosed system may be used in conjunction with a machine that is manually controlled, partially autonomous, or completely autonomous. Operation of navigation system 20 will now be described with reference to FIG. 2.

As can be seen from FIG. 2, the exemplary method of navigation integrity checking may begin with position measuring of machine 12 at time T1 (Step 100). Navigation unit 26 may measure the position of machine 12 and direct a signal indicative of this position to controller 28. The position may include two- or three-dimensional information. After the position of machine 12 at time T1 has been recorded by controller 28, controller 28 may use this information, together with input from sensors 30, to estimate the position of machine 12 at the later time T2. Specifically, controller 28 may determine the travel speed and heading of machine 12 during the period from time T1 to time T2 based on signals generated by sensors 30 (Step 110). Controller 28, using Newtonian laws and the assumptions that machine 12 does not move in a lateral direction (i.e., machine 12 may not slide sideways) and that traction devices 18 do not slip, may then calculate a total distance traveled during the time period and a direction of the travel based on the travel speed and heading information collected during the time period. Controller 28, may then estimate the position of machine 12 at time T2 using the total distance traveled and travel direction information (Step 120). That is, controller 28 may add to the original position of machine 12 at time T2 the total distance that machine 12 traveled in the measured travel direction to calculate the final position of machine 12 at time T2. Simultaneously, the position of machine 12 at time T2 may be measured by navigation unit 26 (Step 130).

Controller 28 may check the integrity of navigation unit 26 by comparing the measured position at time T2 with the estimated position to determine if a difference between the two positions is greater than a threshold amount (Step 140). If the difference between the measured and estimated positions at time T2 is less than the threshold amount, it can be concluded that navigation unit 26 is functioning properly (Step 140: Yes), and control may return to step 100. However, if at step 140, the difference between the measured and estimated positions is greater than the threshold amount (Step 140: No), it can be concluded that navigation unit 26 is malfunctioning (i.e., that the measured position of machine 12 is inaccurate) and corrective action should be implemented (Step 150). As described above, the corrective action may include providing a warning of the malfunction to the operator of machine 12, affecting steering of machine 12, affecting propulsion of machine 12, and/or affecting braking of machine 12 via selective control of power source 16, steering device 22, and braking device 24. In one embodiment, when the difference between the measured and estimated positions of machine 12 is greater than the threshold amount for at least a set time period, controller 28 may autonomously stop all travel of machine 12.

Navigation system 20 may be simple, inexpensive, and robust. Specifically, navigation system 20 may require only a single navigation unit (i.e., navigation unit 26), and utilize existing sensors (i.e., travel speed and steering angle sensors 30A and 30B) to check the integrity of the navigation unit. This arrangement may result in an uncomplicated, low-cost solution to machine guidance and control. In addition, malfunction of the navigation unit may be determined by direct comparison of measurement error against a threshold amount, as well as by comparison of error drift over time, both of which may help to improve the robustness of navigation system 20.

It will be apparent to those skilled in the art that various modifications and variations can be made to the navigation system of the present disclosure. Other embodiments of the navigation system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A navigation system, comprising:
 a navigation unit configured to measure a position of a machine at a first time and at a second time;
 at least a first sensor configured to generate at least a first signal indicative of a speed and a heading of the machine during a time period from the first time to the second time; and
 a controller in communication with the navigation unit and the at least a first sensor, the controller being configured to:
  estimate a position of the machine at the second time based on the measured position of the machine at the first time and the at least a first signal;
  make a comparison of the measured position of the machine at the second time with the estimated position of the machine at the second time;
  determine that the navigation unit has malfunctioned when the measured position at the second time is different than the estimated position at the second time by a threshold amount; and
  selectively implement evasive machine control when the navigation unit is determined to have malfunctioned for a set period of time,
  wherein implementing the evasive machine control includes changing a heading of the machine.

2. The navigation system of claim 1, wherein the at least a first sensor includes a speed sensor configured to generate a speed signal indicative of a travel speed of the machine, and a steering angle sensor configured to generate a first heading signal indicative of a heading of the machine.

3. The navigation system of claim 2, wherein the at least a first sensor further includes a pitch sensor configured to generate a second heading signal indicative of the heading of the machine.

4. The navigation system of claim 3, wherein the controller is configured to estimate the position of the machine at the second time based on signals from the speed sensor, the steering angle sensor, the pitch sensor, and known kinematics of the machine.

5. The navigation system of claim 1, wherein the navigation unit is a GPS unit.

6. The navigation system of claim 1, wherein implementing the evasive machine control further includes changing a speed of the machine.

7. The navigation system of claim 6, wherein implementing the evasive machine control includes bringing the machine to a stop.

8. The navigation system of claim 1, wherein at least one of the threshold amount, the set period of time, and the evasive machine control are operator adjustable.

9. The navigation system of claim 1, wherein the controller is further configured to replace the measured position at the second time with the estimated position at the second time for machine control purposes when the navigation unit is determined to be malfunctioning.

10. The navigation system of claim 1, wherein the controller is further configured to make additional comparisons of estimated positions of the machine at successive instances in time with the measured position, and determine an accuracy of the navigation unit drifting based on trend analysis of the additional comparisons.

11. A non-transitory computer readable medium for use by a navigation system, the non-transitory computer readable medium having executable instructions for performing a method of accuracy checking a measured position, the method comprising:
 measuring a position of a machine at a first time and at a second time;
 measuring a speed and a heading of the machine during a time period from the first time to the second time; and
 estimating a position of the machine at the second time based on the measured position of the machine at the first time and the measured speed and heading;
 making a comparison of the measured position of the machine at the second time with the estimated position of the machine at the second time;
 determining that the measured position is inaccurate when the measured position of the machine at the second time is different than the estimated position of the machine at the second time by a threshold amount; and
 selectively implementing evasive machine control when the measured position of the machine at the second time is determined to be inaccurate for a set period of time,
 wherein implementing the evasive machine control includes changing a heading of the machine.

12. The computer readable medium of claim 11, wherein measuring a heading includes measuring a steering angle of the machine.

13. The computer readable medium of claim 12, wherein measuring a heading further includes measuring a pitch of the machine.

14. The computer readable medium of claim 11, wherein the method further includes replacing the measured position of the machine at the second time with the estimated position of the machine at the second time for machine control purposes when the measured position of the machine at the second time is determined to be inaccurate.

15. A machine, comprising:
a power source;
at least one traction device driven by the power source to propel the machine;
a GPS unit configured to measure a position of the machine at a first time and at a second time;
a speed sensor configured to generate a first signal indicative of a travel speed of the machine during a time period from the first time to the second time;
a steering sensor configured to generate a second signal indicative of a heading of the machine during the time period; and
a controller in communication with the GPS unit, the speed sensor, and the steering sensor, the controller being configured to:
estimate a position of the machine at the second time based on the measured position of the machine at the first time and the first and second signals;
make a comparison of the measured position of the machine at the second time with the estimated position of the machine at the second time;
determine that the GPS unit has malfunctioned when the measured position of the machine at the second time deviates from the estimated position of the machine at the second time by a threshold amount; and
implement evasive maneuvering of the machine when the GPS unit is determined to have malfunctioned for a set period of time,
wherein implementing the evasive maneuvering of the machine includes changing a heading of the machine.

* * * * *